March 22, 1966     A. F. CURTISS     3,241,510
METHOD OF MAKING BAIL EARS WITH SEGMENTED FLANGES
Original Filed Oct. 31, 1962
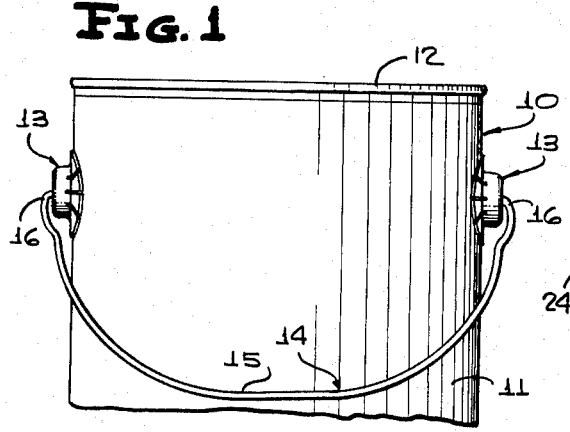
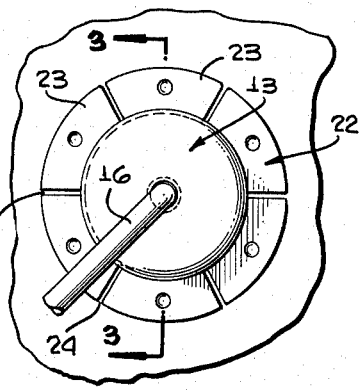
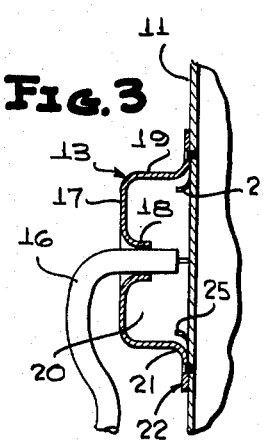
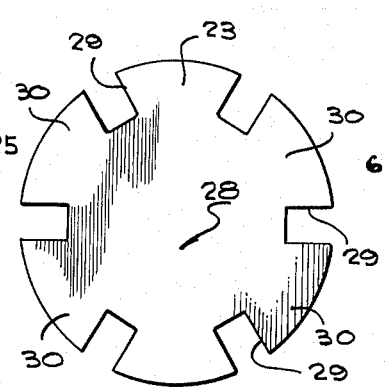
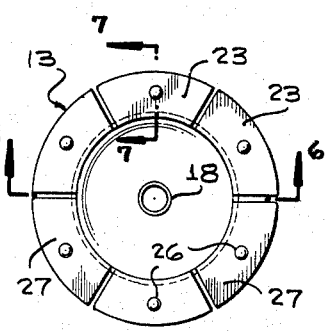
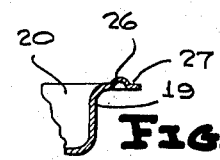
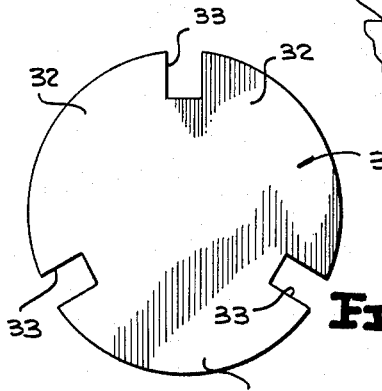
INVENTOR
ALAN F. CURTISS
BY
ATTORNEYS

United States Patent Office 3,241,510
Patented Mar. 22, 1966

3,241,510
METHOD OF MAKING BAIL EARS WITH
SEGMENTED FLANGES
Alan F. Curtiss, La Grange, Ill., assignor to Continental Can Company, Inc., New York, N.Y., a corporation of New York
Original application Oct. 31, 1962, Ser. No. 234,416, now Patent No. 3,158,285, dated Nov. 24, 1954. Divided and this application Mar. 20, 1964, Ser. No. 353,414
12 Claims. (Cl. 113—120)

This invention rleates to a new and useful method of making bail ears including segmented flanges adapted to be spot welded to a container body, and in particular, to a novel method of forming metallic bail ears which have a plurality of weep holes in the flanges thereof.

This application constitutes a division of my copending application for U.S. Letters Patent Serial No. 234,416, filed October 31, 1962, and now Patent No. 3,158,285.

In the manufacture of containers or cans having bail ears spot welded to an upper part of the containers, after the spot welding operation, the containers are tested to detect leaks at the weld points.

A method of detecting the presence of leaks after the above-mentioned welding operation is to subject the interior of a container to pressurized air while the container is submerged below the surface of a body of water. Typically, a plurality of containers or cans are transported by a conveyor to a tank or vat of water. One end of each of the containers is open and a plate is placed in sealing contact with the open end. The plate is suitably apertured for placing the interior of the container in communication with a source of pressurized air. As the conveyor submerges each of the containers below the surface of the water in the tank, defective containers can be immediately identified by the presence of air bubbles on the surface of the water as the air within the container escapes through leaks at the weld points of the bail ears and the container body, and rises to the surface of the water in a stream of bubbles. The defective container may be removed from the conveyor and discarded by an operator. Containers which are free of defects continue along the conveyor for subsequent filling.

During the time that the containers are submerged in the tank, water enters into the interiors of the bail ears through the conventional bail trunnions thereof. When the containers are removed from the tank, the water is trapped within the interiors of the bail ears. This trapped water results in the subsequent rusting of the bail ears and causes the bail ears to break away from the containers when the containers are subsequently filled and carried by conventional bails journaled in the bail ears.

In the specific case of a conventional water pail having a plurality of bail ears welded to a top part thereof, it should be appreciated that water is trapped within the interior of the bail ears when the pail is inspected in the manner disclosed above as well as any other time the pail is immersed into water. Repeated immersion of the pail over a period of time rapidly increases the amount of rusting of the bail ears and, consequently, shortens the lifetime of the pail.

The above-mentioned disadvantages inherent in conventional container and bail ear structure, have been solved to a great degree by the novel formation of a bail ear in accordance with this invention.

An object of this invention is therefore to provide a novel method of fabricating a bail ear from a metallic disk by forming a plurality of radial notches of a predetermined length and width in the disk and thereafter forming the disk into a bail ear by a drawing operation causing the predetermined length of the notches to increase and the predetermined width of the notches to decrease whereby portions of the notches form weep holes of the bail ear adapted to prevent water from being trapped within a recessed interior of the bail ear.

A further object of this invention is to provide a novel method of constructing a bail ear having a segmented flange and a recessed ear including the steps of stamping a plurality of radial notches of a predetermined length and width in a metallic disk and subsequently drawing the disk into a bail ear having a body and a generally planar segmented flange whereby the predetermined length of the notches is increased and the width of the notches is decreased to form weep holes extending into the body of the bail ear adapted to prevent water from being trapped within the recessed interior of the bail ear.

Still another object of this invention is to provide a novel method of constructing a bail ear having a generally planar segmented flange including an annular radius and a recessed interior comprising the steps of providing a bail ear disk with a plurality of notches having a length equal to the radial length of the segmented flange including the annular radius thereof and drawing the bail ear disk into a bail ear whereby portions of the notches form weep holes in the annular radius and adjacent notches divide the segmented flange into flanged segments for securing the bail ear to a metallic container.

With the above and other objects in view that will hereinafter appear, the nature of the invention will be more clearly understood by reference to the following detailed description, the appended claims and the several views illustrated in the accompanying drawing.

In the drawings:

FIGURE 1 is a fragmentary elevational view of a container having a bail pivotally connected thereto by a pair of identical metallic bail ears formed in accordance with the novel method of this invention.

FIGURE 2 is an enlarged fragmentary elevational view of the container and one of the bail ears shown in FIGURE 1 and illustrates a plurality of flanged segments of a segmented flange formed by a plurality of radial notches.

FIGURE 3 is a vertical sectional view taken along line 3—3 of FIGURE 2, and illustrates the notches forming a plurality of weep holes terminating in an annular portion of the bail ear.

FIGURE 4 is a top plan view of a bail ear disk from which the bail ear of FIGURES 2 and 3 is constructed, and illustrates a plurality of radial notches struck in the disk.

FIGURE 5 is a bottom view of the bail ear disk shown in FIGURE 4 after the same has been drawn to the configuration of the bail ear of FIGURES 2 and 3, and illustrates the radial lengthening and circumferential shortening of the plurality of notches.

FIGURE 6 is a diametrical sectional view through the bail ear taken along line 6—6 of FIGURE 5, and more clearly illustrates the radial extent or elongation of the plurality of drawn notches of the segmented flange.

FIGURE 7 is a fragmentary cross-sectional view taken along line 7—7 of FIGURE 5, and illustrates one of a plurality of nibs or embossments formed in a surface of each of the flanged segments.

FIGURE 8 is plan view of a modified bail ear disk, similar to the bail ear disk shown in FIGURE 4, having three equally circumferentially spaced radial notches.

A complete understanding of the novel method of this invention will be best understood by first describing a bail ear construction formed in accordance with the method, and to this end attention is first directed to FIGURES 1 through 3 and 5 through 7 of the drawing.

A container or can 10 including a cylindrical tubular body 11 and an upper end 12 is illustrated in FIGURE 1 of the drawing. A pair of identical bail ears 13, each formed by the novel method of this invention to be described more fully hereafter, are secured adjacent the upper end 12 of the body 11 by spot welding, soldering or a like metal joining process. The bail ears 13 are secured adjacent the upper end 12 of the body 11 in diametrically opposed relationship and a resilient bail 14 having a handle portion 15 and identical ends 16 is pivotally attached by the ends 16 to the bail ears 13.

Each of the identical bail ears 13 includes a substantially circular face wall 17 and an integral centrally inwardly directed trunnion 18. As is best illustrated in FIGURE 3, the trunnion 18 receives and pivotally cooperates with the bail ends 16. A peripheral wall 19 is integrally joined to the face wall 17 and with the face wall 17 forms a recessed bail interior 20. An annular radius 21 joins the peripheral will 19 to an outwardly radially flared segmented flange 22. The annular radius 21 constitutes an integral radially innermost portion of the segmented flange 22.

The segmented flange 22 consists of a plurality of identical arcuate flanged segments 23 separated by a plurality of identical radial notches 24. As is best illustrated in FIGURE 2 of the drawing, there are shown six identical circumferentially disposed equally spaced flanged segments 23 and radial notches 24. Each radial notch 24 is relatively narrow circumferentially and substantially longer in radial extent, as can be best observed in FIGURE 6 of the drawing. Each of the radial notches 24 traverses the entire radial extent of the segmented flange 22 including the integral annular radius 21 thereof.

The portions of the radial notches 24 within the radius 21 define a plurality of weep holes 25 which provide access between the recessed interior 20 of the bail ear 13 and the surrounding atmosphere. The weep holes 25 permit free drainage of water from the recessed interior 20 and thereby prevent the rusting of the bail ear 13.

Each of the flanged segments 23 includes an identical, integral, centrally located nib or embossment 26. Each nib or embossment 26 projects outwardly from a container abutting surface 27 of each of the flanged segments 23, as is best shown in FIGURE 7 of the drawing. When the bail ears 13 are secured to the container body 11 by the spot welding operation heretofore noted, the nibs or embossements 26 are subjected to conventional spot welding heat and pressure. This heat and pressure operates to flatten each of the nibs 26 against the container body 11 and forms the segmented flange 22 to the external configuration of the body 11.

In accordance with the novel method of this invention, a bail ear such as the bail ear 13 is fabricated from a sheet metal blank (not shown) of a gauge which may be easily blanked and drawn. The sheet metal blank is first stamped or blanked to form a substantially circular bail ear disk 28 (FIGURE 4) which is provided by the blanking or stamping operation with a plurality of identical radial notches 29. There are six such notches 29 shown in FIGURE 4 of the drawing, but more or less than this number can be provided within the scope of this invention. The radial notches 29 of the disk 28 circumferentiallly divides the disk 28 into six identical arcuate flange segment forming portions 30. The radial notches 29 are greater in circumferential width and lesser in radial length than the radial notches 24 of the completely fabricated bail ear 13 illustrated in FIGURES 2, 3 and 5 of the drawings. The reason for dimensioning the notches 29 as illustrated in FIGURE 4 is to compensate for the deformation of the flanged segment forming portions 30 of the disk 28 when the disk 28 is drawn to the contour of a bail ear, such as the bail ear 13.

During the drawing operation of the bail ear disk 28 to the configuration of the bail ear 13, the disk 28 is deformed or stretched to the configuration of the bail ear 13 by a conventional die set (not shown). As the bail ear 13 is being drawn the axial length thereof is elongated or stretched during the formation of the peripheral wall 19. This axial elongation of the bail ear 13 causes the radial length of the notches 29 of the bail ear disk 28 to increase in length terminating well into the annular radius 21 to form the weep holes 25. Furthermore, the formation of the face wall 17 and the peripheral wall 19 during the drawing operation causes the bail ear disk 28 to decrease in diameter whereby the notches 29 are circumferentially narrowed from the relatively great circumferential width thereof shown in FIGURE 4 to the relatively narrower width of FIGURES 2 and 5 by the reformation of the adjacent flanged segments 30 toward each other.

Inasmuch as the amount of deformation, reformation or stretching of the bail ear disk 28 varies with such factors as the height, diameter and gauge of metal of the desired bail ear, an alternative step in the above method of forming the weep holdes 25 is to dimension the lengths of the notches 29 of the bail ear disk 28 to the combined radial dimensions of the flanged segments 23 and the annular radius 21 of the bail ear 13. This abovementioned dimensioning precludes the drawing of a bail ear without the formation of the weep holes 25 and in no way depends upon the stretching of the bail ear disk for the formation of the weep holes.

The trunnion 18 and the nibs 26 of the bail ear 13 may be formed prior to, simultaneously with or after the drawing of the disk 28 to the desired configuration of the bail ear 13.

The completely fabricated bail ear is then secured adjacent the upper end 12 of the body 11 by the spot welding operation or other conventional securing operation heretofore noted. The pressure of the spot welding operation flattens nibs 26 against the body 11 of the container 10, as heretofore mentioned, and conforms the individual flanged segments 23 to the external configuration of the body 11. Because of the fact that the flange 22 is segmented, each flanged segment 23 thereof has its respective abutting surface 27 in face-to-face contact with the body 11.

A metallic bail ear disk 31, which is of a modification of the bail ear disk 28 of FIGURE 4, is illustrated in FIGURE 8 of the drawing. The bail ear disk 31 differs from the bail ear disk 28 in that there are only three identical arcuate flange segment forming portions 30 equally peripherally disposed about the disk 31 and three identical radial notches 32. The bail ear fabricated from the disk 31 is similar to the bail ear 13 except that the completely formed bail ear has only three flanged segments and three radial notches. Such a bail ear is, of course, again formed by the novel striking and drawing steps heretofore described by which the circumferential width of the notches 32 is decreased and the radial length of the notches 32 are increased to form weep holes corresponding to the weep holes 25 in the annular portion 21 of the bail ear 13.

From the above, it is readily apparent that various modifications in the disclosed method of forming the bail ear would be obvious to one skilled in the art, therefore, this disclosure is considered exemplary only and not limited to the specifically disclosed method. For example, the novel method of this invention is equally applicable to the formation of a bail ear having but a single radial notch and a single weep hole. Furthermore, if desired, the nibs or embossments need not be formed on the flanged segments and such elimination is deemed within the scope of this invention.

Therefore, while a novel method of forming bail ears having segmented flanges and weep holes has been disclosed herein, it is to be understood that changes in the method may be made without departing from the spirit and scope of the invention as defined in the appended claims.

I claim:

1. The method of constructing a bail ear having a segmented flange and a recessed interior comprising the steps of providing a disk with a plurality of radial notches of a predetermined length and width and increasing the predetermined length of the notches and decreasing the predetermined width of the notches by forming said disk into a bail ear having a body and a generally planar flange whereby portions of said notches form weep holes extending into the body of the bail ear adapted to prevent water from being trapped within the recessed interior of the bail ear.

2. The method of constructing a bail ear having a segmented flange and a recessed interior comprising the steps of providing a disk with a plurality of radial notches of a predetermined length and width and subsequently drawing said disk into a bail ear having a body and a generally planar segmented flange thereby causing the predetermined length of the notches to increase and the predetermined width of the notches to decrease whereby portions of said notches form weep holes extending into the body of the bail ear adapted to prevent water from being trapped within the recessed interior of the bail ear.

3. The method of constructing a bail ear having a segmented flange and a recessed interior comprising the steps of stamping a plurality of radial notches of a predetermined length and width in a metallic disk and subsequently drawing said disk into a bail ear having a body and a generally planar segmented flange thereby causing the predetermined length of the notches to increase and the predetermined width of the notches to decrease whereby portions of said notches form weep holes extending into the body of the bail ear adapted to prevent water from being trapped within the recessed interior of the bail ear.

4. The method of constructing a bail ear having a generally planar segmented flange including an annular radius and a recessed interior comprising the steps of providing a bail ear disk with a plurality of notches having a length equal to the radial length of the segmented flange including the annular radius thereof of the drawn bail ear, and forming said bail ear disk into a bail ear whereby portions of said notches form weep holes in the annular radius of said segmented flange adapted to prevent water from being trapped within the recessed interior of the bail ear.

5. The method of forming a bail ear having a segmented flange and a recessed interior comprising the steps of striking a plurality of radial notches of a predetermined length and width in a metallic sheet, increasing the predetermined length and decreasing the predetermined width of the notches by forming a generally cylindrical body joined to a flange by an annular radius from the metallic sheet by a drawing operation whereby the metallic sheet elongates in a radial direction and compresses in a circumferential direction, and the drawing of the sheet being sufficient for the notch to terminate at least in the annular radius to form weep holes adapted to prevent water from being trapped within the bail ear.

6. The method as defined in claim 5 including the further step of forming nibs in the segmented flange, and flattening the nibs by the application of heat and pressure thereto when the bail ear is secured to a container.

7. The method of constructing a bail ear having a flange and a recessed interior comprising the steps of providing a disk with a radial notch of a predetermined length and width and increasing the predetermined length of the notch and decreasing the predetermined width of the notch by forming said disk into a bail ear having a body and a generally planar flange whereby portions of said notch form a weep hole extending into the body of the bail ear adapted to prevent water from being trapped within the recessed interior of the bail ear.

8. The method of constructing a bail ear having a flange and a recessed interior comprising the steps of providing a disk with a radial notch of a predetermined length and width and subsequently drawing said disk into a bail ear having a body and a generally planar flange thereby causing the predetermined length of the notch to increase and the predetermined width of the notch to decrease whereby portions of said notch form a weep hole extending into the body of the bail ear adapted to prevent water from being trapped within the recessed interior of the bail ear.

9. The method of constructing a bail ear having a flange and a recessed interior comprising the steps of stamping a radial notch of a predetermined length and width in a metallic disk and subsequently drawing said disk into a bail ear having a body and a generally planar flange thereby causing the predetermined length of the notch to increase and the predetermined width of the notch to decrease whereby portions of said notch form a weep hole extending into the body of the bail ear adapted to prevent water from being trapped within the recessed interior of the bail ear.

10. The method of constructing a bail ear having a generally planar flange including an annular radius and a recessed interior comprising the steps of providing a bail ear disk with a notch having a length equal to the radial length of the segmented flange including the annular radius thereof and forming said bail ear disk into a bail ear whereby portions of said notch form weep holes in the annular radius of said flange adapted to prevent water from being trapped within the recessed interior of the bail ear.

11. The method of forming a bail ear having a flange and a recessed interior comprising the steps of striking a radial notch of a predetermined length and width in a metallic sheet, increasing the predetermined length and decreasing the predetermined width of the notch by forming a generally cylindrical body joined to a flange by an annular radius from the metallic sheet by a drawing operation whereby the metallic sheet elongates in a radial direction and compresses in a circumferential direction, and the drawing of the sheet being sufficient for the notch to terminate at least in the annular radius to form the weep hole adapted to prevent water from being trapped within the bail ear.

12. The method as defined in claim 11 including the further step of forming nibs in the flange and flattening the nibs by the application of heat and pressure thereto when the bail ear is secured to a container.

References Cited by the Examiner

UNITED STATES PATENTS

| | | | |
|---|---|---|---|
| 1,433,881 | 10/1922 | Faucher et al. | 29—533 |
| 1,670,131 | 5/1928 | Allerton | 113—120 |

FOREIGN PATENTS 383,140  11/1932  Great Britain.

CHARLES W. LANHAM, *Primary Examiner.*